United States Patent
Goto et al.

(10) Patent No.: US 12,264,218 B2
(45) Date of Patent: Apr. 1, 2025

(54) POLYCARBONATE RESIN

(71) Applicant: MITSUBISHI GAS CHEMICAL COMPANY, INC., Tokyo (JP)

(72) Inventors: Toshihito Goto, Ibaraki (JP); Noriyoshi Ogawa, Ibaraki (JP)

(73) Assignee: MITSUBISHI GAS CHEMICAL COMPANY, INC., Tokyo (JP)

( * ) Notice: Subject to any disclaimer, the term of this patent is extended or adjusted under 35 U.S.C. 154(b) by 471 days.

(21) Appl. No.: 17/616,821

(22) PCT Filed: Jun. 1, 2020

(86) PCT No.: PCT/JP2020/021591
§ 371 (c)(1),
(2) Date: Dec. 6, 2021

(87) PCT Pub. No.: WO2020/250732
PCT Pub. Date: Dec. 17, 2020

(65) Prior Publication Data
US 2022/0306802 A1    Sep. 29, 2022

(30) Foreign Application Priority Data
Jun. 10, 2019    (JP) ................................. 2019-108054

(51) Int. Cl.
*C08G 64/08*    (2006.01)
*C08J 3/09*    (2006.01)
*C08J 5/18*    (2006.01)

(52) U.S. Cl.
CPC ............ *C08G 64/081* (2013.01); *C08J 3/095* (2013.01); *C08J 5/18* (2013.01); *C08J 2369/00* (2013.01)

(58) Field of Classification Search
CPC .... C08G 64/04; C08G 64/081; C08J 2369/00; C08J 3/095; C08J 5/18
See application file for complete search history.

(56) References Cited

U.S. PATENT DOCUMENTS 4,153,780 A * 5/1979 Narita ..................... C08G 64/24
                                                    528/198
4,221,645 A * 9/1980 Adelmann ................. C08J 3/28
                                                    528/125
(Continued)

FOREIGN PATENT DOCUMENTS

CN          103354820 A        10/2013
EP        2 455 798 B1 *        7/2015
(Continued)

OTHER PUBLICATIONS

Kuila et al "Tris(hydroxyphenyl)ethane Benzotriazole: A Copolymerizable UV Light Stabilizer",Chem. Mater. 1999, 11, 109-116 (Year: 1999).*

(Continued)

*Primary Examiner* — Frances Tischler
*Assistant Examiner* — Gennadiy Mesh
(74) *Attorney, Agent, or Firm* — GREENBLUM & BERNSTEIN P.L.C.

(57) ABSTRACT

Provided is a polycarbonate resin having excellent solubility in low-boiling-point non-halogenated solvents and having a high glass transition temperature. The polycarbonate resin includes constituent units (A) represented by general formula (1) (for example 4,4'-(4-methylpentane-2,2-diyl)diphenol) and constituent units (B) represented by general formula (2) (for example 4,4'-(1-phenylethane-1,1-diyl)diphenol), the molar ratio of the constituent units (A) to the constituent units (B), A/B, being 45/55 to 95/5, and includes a terminal structure selected from formula (T1) (for example p-t-butylphenol) and/or formula (T2) (for example 3-(2H-benzotriazol-2-yl)-4-hydroxyphenethylmethacrylate).

10 Claims, No Drawings

(56) References Cited

U.S. PATENT DOCUMENTS

| | | | | |
|---|---|---|---|---|
| 5,523,379 | A | * | 6/1996 | Rosenquist ............ C08G 64/12 |
| | | | | 544/215 |
| 6,096,852 | A | * | 8/2000 | Lensvelt ................ C08K 5/134 |
| | | | | 528/196 |
| 12,006,398 | B2 | * | 6/2024 | Ishikawa ................ C08G 64/14 |
| 2011/0244182 | A1 | * | 10/2011 | Hunt ....................... C08L 51/08 |
| | | | | 428/141 |
| 2013/0310535 | A1 | | 11/2013 | Kato et al. |
| 2016/0252829 | A1 | * | 9/2016 | Kawahara ............ G03G 5/0525 |
| | | | | 430/56 |
| 2018/0031985 | A1 | | 2/2018 | Nishida et al. |
| 2022/0177644 | A1 | * | 6/2022 | Ishikawa ................ C08G 64/14 |
| 2022/0306802 | A1 | * | 9/2022 | Goto ........................ C08J 3/095 |

FOREIGN PATENT DOCUMENTS

| | | | |
|---|---|---|---|
| JP | 63-89529 | A | 4/1988 |
| JP | 63-89540 | A | 4/1988 |
| JP | 2-99521 | A | 4/1990 |
| JP | 2-128336 | A | 5/1990 |
| JP | 3417949 | B2 | 6/2003 |
| JP | 2010-189629 | A | 9/2010 |
| JP | 2011-246583 | A | 12/2011 |
| JP | 2016-160291 | A | 9/2016 |
| JP | 2017-31245 | A | 2/2017 |
| JP | 2018-25780 | A | 2/2018 |
| JP | 2018-45138 | A | 3/2018 |

OTHER PUBLICATIONS

International Search Report and Written Opinion of the International Searching Authority issued in International Patent Application No. PCT/JP2020/021591, dated Aug. 11, 2020, along with an English translation thereof.
Extended European Search Report issued in the corresponding European Patent Application No. 20823596.0 on Jul. 8, 2022.
Office Action issued in Chinese Patent Application No. 202080042065.6 dated Nov. 29, 2022, along with English translation thereof.

* cited by examiner

POLYCARBONATE RESIN

TECHNICAL FIELD

The present invention relates to a polycarbonate resin and a resin solution and a film which are obtained by using the same.

BACKGROUND ART

Polycarbonate resins are widely used in electrical and electronic equipments, office automation equipments, optical media, automobile components, building components and the like because of excellent mechanical strength, heat resistance, electrical property, dimensional stability, flame retardance, transparency and the like thereof (e.g., Patent Documents 1-5).

The production of polycarbonate films is roughly classified into extrusion molding and wet molding. Among them, wet molding is utilized as a method for forming a polycarbonate resin having a high glass transition temperature into a film. For efficiently performing wet molding, it is required to use an organic solvent having a relatively low boiling point to dissolve a resin with a high concentration (e.g., 20% by mass or more). As low-boiling-point solvents having excellent solubility of resins, halogenated solvents are conventionally used, but recently, in consideration of the environment, it has been required to use non-halogenated solvents not containing halogen.

As low-boiling-point non-halogenated solvents to be used for wet molding, ketone-based solvents and ester-based solvents are known. However, conventionally used polycarbonate resins having a high glass transition temperature may have poor solubility in these solvents and have a problem of poor molding efficiency with respect to wet molding.

PRIOR ART DOCUMENTS

Patent Documents

Patent Document 1: Japanese Laid-Open Patent Publication No. S63-89540

Patent Document 2: Japanese Laid-Open Patent Publication No. H02-99521

Patent Document 3: Japanese Laid-Open Patent Publication No. H02-128336

Patent Document 4: Japanese Laid-Open Patent Publication No. 2017-031245

Patent Document 5: Japanese Laid-Open Patent Publication No. 2011-246583

SUMMARY OF THE INVENTION

Under the above-described circumstances, it has been desired to provide a novel polycarbonate resin.

The present invention is, for example, as described below.

[1] A polycarbonate resin which comprises a structural unit (A) represented by general formula (1) and a structural unit (B) represented by general formula (2), the molar ratio between the structural unit (A) and the structural unit (B) (A/B) being 45/55 to 95/5:

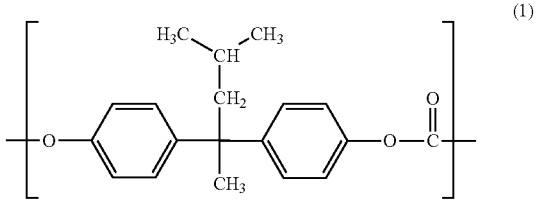

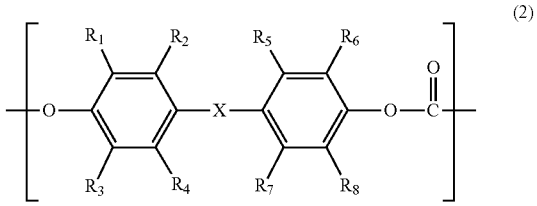

wherein in formula (2):

$R_1$, $R_2$, $R_3$, $R_4$, $R_5$, $R_6$, $R_7$ and $R_8$ are each independently selected from a hydrogen atom, a fluorine atom, a chlorine atom, a bromine atom, an iodine atom, an alkyl group having 1 to 7 carbon atoms, an aryl group having 6 to 12 carbon atoms, an alkenyl group having 2 to 7 carbon atoms, an alkoxy group having 1 to 7 carbon atoms and an aralkyl group having 7 to 17 carbon atoms, and each of the alkyl group, the aryl group, the alkenyl group, the alkoxy group and the aralkyl group may have a substituent; and X represents —O—, —S—, —SO—, —SO$_2$—, —CO—, a cycloalkylene group having 6 to 12 carbon atoms or a divalent group represented by general formula (3) or general formula (4), and the cycloalkylene group may be substituted with 1 to 12 alkyl groups having 1 to 3 carbon atoms:

wherein in formula (3):

$R_9$ and $R_{10}$ are each independently selected from a hydrogen atom, a fluorine atom, a chlorine atom, a bromine atom, an iodine atom, an alkyl group having 1 to 20 carbon atoms, an alkoxy group having 1 to 5 carbon atoms, an aryl group having 6 to 12 carbon atoms, an aralkyl group having 7 to 17 carbon atoms and an alkenyl group having 2 to 15 carbon atoms;

each of the alkyl group, the alkoxy group, the aryl group, the aralkyl group and the alkenyl group in $R_9$ and $R_{10}$ may have a substituent;

$R_9$ and $R_{10}$ may be bonded to each other to form a carbocyclic ring having 3 to 20 carbon atoms or a heterocyclic ring having 1 to 20 carbon atoms, and each of the carbocyclic ring and the heterocyclic ring may have a substituent;

there is no case where both $R_9$ and $R_{10}$ are a methyl group; and n represents an integer of 0 to 20,

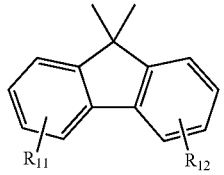

(4)

wherein in formula (4):

$R_{11}$ and $R_{12}$ are each independently selected from a hydrogen atom, a fluorine atom, a chlorine atom, a bromine atom, an iodine atom, an alkyl group having 1 to 20 carbon atoms, an alkoxy group having 1 to 7 carbon atoms, an aryl group having 6 to 12 carbon atoms, an aralkyl group having 7 to 17 carbon atoms and an alkenyl group having 2 to 15 carbon atoms, and each of the alkyl group, the alkoxy group, the aryl group, the aralkyl group and the alkenyl group may have a substituent; and $R_{11}$ and $R_{12}$ may be bonded to each other to form a carbocyclic ring having 3 to 20 carbon atoms or a heterocyclic ring having 1 to 20 carbon atoms, and each of the carbocyclic ring and the heterocyclic ring may have a substituent.

[1a] The resin according to item [1], wherein X represents —O—, —S—, —SO—, —SO$_2$—, —CO—, a cyclohexene group substituted with 1 to 12 alkyl groups having 1 to 3 carbon atoms, a cycloalkylene group having 7 to 12 carbon atoms which may be substituted with 1 to 12 alkyl groups having 1 to 3 carbon atoms, or a divalent group represented by general formula (3) or general formula (4) above.

[2] The resin according to item [1], which has a viscosity average molecular weight (Mv) of 16,000 to 80,000.

[2a] The resin according to item [1], which has a viscosity average molecular weight (Mv) of 20,000 to 80,000.

[3] The resin according to item [1] or [2], which has a viscosity average molecular weight (Mv) of 26,000 to 80,000.

[4] The resin according to any one of items [1] to [3], which has a glass transition temperature (Tg) of 150° C. or higher.

[5] The resin according to any one of items [1] to [4], wherein the structural unit (B) is represented by general formula (3A):

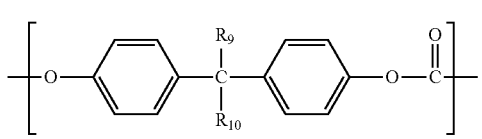

(3A)

wherein:

$R_9$ represents an alkyl group having 1 to 20 carbon atoms; and $R_{10}$ represents an aryl group having 6 to 12 carbon atoms.

[6] The resin according to item [5], wherein the structural unit (B) is represented by general formula (3B):

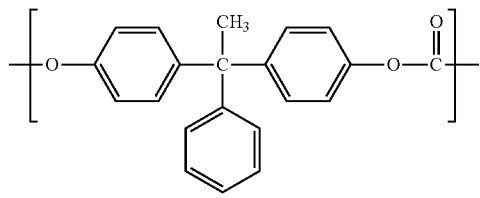

(3B)

[7] The resin according to any one of items [1] to [4], wherein the structural unit (B) is represented by general formula (5A):

(5A)

wherein $R_{13}$, $R_{14}$, $R_{15}$, $R_{16}$, $R_{17}$, $R_{18}$, $R_{19}$, $R_{20}$, $R_{21}$ and $R_{22}$ each independently represent a hydrogen atom or an alkyl group having 1 to 3 carbon atoms.

[7a] The resin according to any one of items [1] to [4], wherein the structural unit (B) is represented by general formula (5):

(5)

wherein:

m represents an integer of 1 to 7; and $R_{13}$, $R_{14}$, $R_{15}$, $R_{16}$, $R_{17}$, $R_{18}$, $R_{19}$, $R_{20}$, $R_{21}$ and $R_{22}$ each independently represent a hydrogen atom or an alkyl group having 1 to 3 carbon atoms.

[7b] The resin according to item [7a], wherein in formula (5):

(i) m is 1, $R_{13}$, $R_{14}$, $R_{15}$, $R_{16}$, $R_{17}$, $R_{18}$, $R_{19}$, $R_{20}$, $R_{21}$ and $R_{22}$ each independently represent a hydrogen atom or an alkyl group having 1 to 3 carbon atoms, and at least one of $R_{13}$, $R_{14}$, $R_{15}$, $R_{16}$, $R_{17}$, $R_{18}$, $R_{19}$, $R_{20}$, $R_{21}$ and $R_{22}$ is an alkyl group having 1 to 3 carbon atoms; or (ii) m represents an integer of 2 to 7, and $R_{13}$, $R_{14}$, $R_{15}$, $R_{16}$, $R_{17}$, $R_{18}$, $R_{19}$, $R_{20}$, $R_{21}$ and $R_{22}$ each independently represent a hydrogen atom or an alkyl group having 1 to 3 carbon atoms.

[8] The resin according to item [7], wherein at least one of $R_{13}$, $R_{14}$, $R_{15}$, $R_{16}$, $R_{17}$, $R_{18}$, $R_{19}$, $R_{20}$, $R_{21}$ and $R_{22}$ is an alkyl group having 1 to 3 carbon atoms.

[9] The resin according to any one of items [1] to [4], wherein X represents a cycloalkylene group having 7 to 12 carbon atoms, and wherein the cycloalkylene group may be substituted with 1 to 12 alkyl groups having 1 to 3 carbon atoms.

[10] The resin according to any one of items [1] to [4], wherein: X represents a divalent group represented by formula (4) above; and $R_{11}$ and $R_{12}$ are each independently selected from a hydrogen atom and an aryl group having 6 to 12 carbon atoms.

[11] The resin according to any one of items [1] to [10], wherein $R_1$, $R_2$, $R_3$, $R_4$, $R_5$, $R_6$, $R_7$ and $R_8$ are each independently selected from a hydrogen atom, an alkyl group having 1 to 3 carbon atoms and an aryl group having 6 to 12 carbon atoms.

[12] A film containing the polycarbonate resin according to any one of items [1] to [11].

[12a] A resin composition containing the polycarbonate resin according to any one of items [1] to [11].

[13] A resin solution containing a non-halogenated organic solvent and the polycarbonate resin according to any one of items [1] to [11] dissolved in the non-halogenated solvent.

[14] The resin solution according to item [13], wherein the concentration of the polycarbonate resin in the resin solution is 20% by mass or more.

[15] The resin solution according to item [13] or [14], wherein the non-halogenated organic solvent is at least one of a ketone-based solvent and an ester-based solvent.

[15a] The resin solution according to item [13] or [14], wherein the non-halogenated organic solvent is at least one of methyl ethyl ketone and ethyl acetate.

[16] A film obtained by wet-molding the resin solution according to any one of items [13] to [15].

[16a] A method for producing a film, which includes performing wet molding using the resin solution according to any one of items [13] to [15].

[17] The resin according to any one of items [1] to [10], wherein the polycarbonate resin comprises a terminal structure T selected from a terminal structure represented by formula (T1) (in particular, a terminal structure derived from p-hydroxyphenethyl alcohol (PHEP)), a terminal structure represented by formula (T2) (in particular, a terminal structure represented by formula (T3)) and a terminal structure represented by formula (T4):

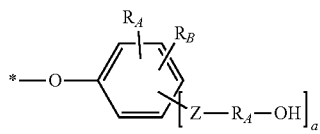
(T1)

wherein in formula (T1):

$R_A$ represents an alkylene group having 1 to 20 carbon atoms or alkenylene group having 2 to 20 carbon atoms, which may have a substituent;

$R_B$ and $R_C$ each independently represent a hydrogen atom, an alkyl group having 1 to 20 carbon atoms, an alkoxy group having 1 to 10 carbon atoms or an aryl group having 6 to 12 carbon atoms;

Z represents an ether bond, a carbonyl group, an ester bond or a single bond;

a represents an integer of 1 to 3; and

* represents a position of bonding to the main chain of the polycarbonate resin,

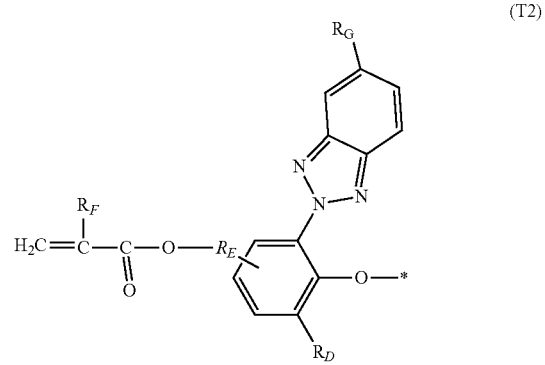

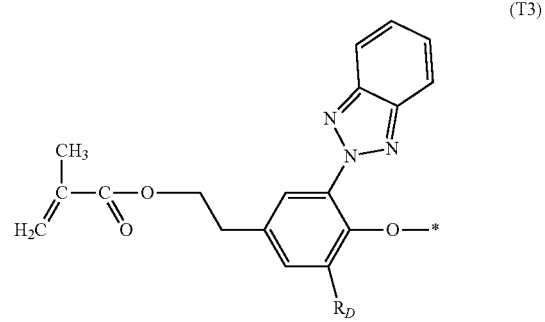

wherein in formula (T2) and formula (T3):

$R_D$ represents hydrogen or an alkyl group having 1 to 6 carbon atoms;

$R_E$ represents an alkylene group having 1 to 6 carbon atoms;

$R_F$ represents a hydrogen atom or a methyl group;

$R_G$ represents a hydrogen atom or halogen; and

* represents a position of bonding to the main chain of the polycarbonate resin,

(T4)

[18] The resin according to item [17], which comprises the terminal structure T in an amount of 0.95 mol or more (preferably 1.5 mol or more) but 10 mol or less (preferably 5 mol or less) relative to 100 mol of structural units derived from a dihydroxy compound (for example, the sum of the structural unit (A) represented by general formula (1) and the structural unit (B) represented by general formula (2)).

According to one embodiment of the present invention, a polycarbonate resin having excellent solubility in low-boiling-point non-halogenated solvents and having a high glass transition temperature is provided.

Since the polycarbonate resin of the embodiment has excellent solubility in low-boiling-point non-halogenated solvents, satisfactory molded products can be produced efficiently at a low cost, and therefore the productivity is improved and it is environmentally excellent.

In a preferred embodiment, a polycarbonate resin having excellent solubility in a ketone-based solvent and/or an ester-based solvent and having a high glass transition temperature (e.g., 150° C. or higher) is provided.

BEST MODE FOR CARRYING OUT THE INVENTION

Hereinafter, meanings of terms, etc. described in this specification will be explained, and the present invention will be described in detail.

The term "alkyl" means a linear, cyclic or branched saturated aliphatic hydrocarbon group having a specified number of carbon atoms.

The term "aryl" means an aromatic hydrocarbon cyclic group having a specified number of carbon atoms.

The term "alkenyl" means a linear or branched hydrocarbon group having a specified number of carbon atoms and at least one carbon-carbon double bond. Examples thereof include, but are not limited to, monoene, diene, triene and tetraene.

The term "alkoxy" means a group in which an oxygen atom (O) is bonded to the end of an alkyl having a specified number of carbon atoms.

The term "aralkyl" means a group in which one of hydrogen atoms of an alkyl is substituted with aryl.

The term "alkylene" means a divalent linear, cyclic or branched saturated aliphatic hydrocarbon group having a specified number of carbon atoms.

The term "alkenylene" means a divalent linear or branched hydrocarbon group having a specified number of carbon atoms and at least one carbon-carbon double bond.

The term "cycloalkylene" means a divalent cyclic alkyl having a specified number of carbon atoms.

The term "halogen" means a fluorine atom (F), a chlorine atom (Cl), a bromine atom (Br) or an iodine atom (I).

1. Polycarbonate Resin

One embodiment of the present invention provides a polycarbonate resin comprising a structural unit (A) represented by general formula (1) and a structural unit (B) represented by general formula (2). In the polycarbonate resin, the molar ratio between the structural unit (A) and the structural unit (B) (A/B) is 45/55 to 95/5. In one embodiment, the polycarbonate resin is a copolymer comprising the structural unit (A) and the structural unit (B). The copolymer may have a structure of either a random copolymer, block copolymer or alternating copolymer.

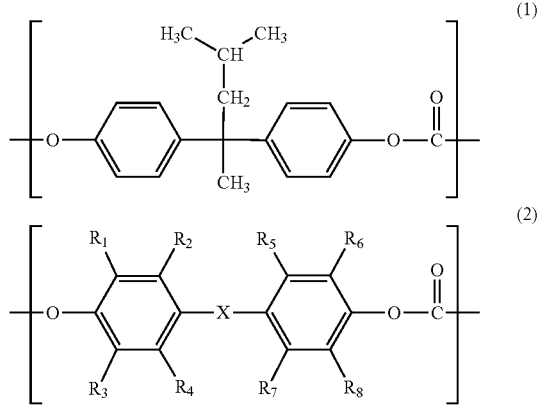

The polycarbonate resin of the embodiment (hereinafter sometimes referred to as just "the polycarbonate resin") can achieve a balance between a high glass transition temperature (Tg) and excellent solubility in low-boiling-point non-halogenated solvents. It is not known exactly why high Tg and satisfactory solubility in solvents as described above are achieved, but the present inventors infer that this is because a polycarbonate resin satisfying the two properties simultaneously is obtained by copolymerizing the structural unit (A) showing satisfactory solubility in solvents and the structural unit (B) showing a high Tg at a specific ratio.

In formula (2) above, $R_1$, $R_2$, $R_3$, $R_4$, $R_5$, $R_6$, $R_7$ and $R_8$ (hereinafter sometimes abbreviated as "$R_1$ to $R_8$") are each independently selected from a hydrogen atom, a fluorine atom, a chlorine atom, a bromine atom, an iodine atom, an alkyl group having 1 to 7 carbon atoms (preferably 1 to 5 carbon atoms, and more preferably 1 to 3 carbon atoms), an aryl group having 6 to 12 carbon atoms (preferably 6 to 10 carbon atoms, and more preferably 6 to 8 carbon atoms), an alkenyl group having 2 to 7 carbon atoms (preferably 2 to 5 carbon atoms, and more preferably 2 to 3 carbon atoms), an alkoxy group having 1 to 7 carbon atoms (preferably 1 o 5 carbon atoms, and more preferably 1 to 3 carbon atoms) and an aralkyl group having 7 to 17 carbon atoms (preferably 7 to 12 carbon atoms, and more preferably 7 to 10 carbon atoms).

Each of the alkyl group, the aryl group, the alkenyl group, the alkoxy group and the aralkyl group in $R_1$ to $R_8$ may have a substituent. The substituent that may be possessed is at least one selected from a fluorine atom, a chlorine atom, a bromine atom, an iodine atom, an alkyl group having 1 to 20 carbon atoms (preferably 1 to 10 carbon atoms, and more preferably 1 to 3 carbon atoms) and an aryl group having 6 to 12 carbon atoms (preferably 6 to 10 carbon atoms, and more preferably 6 to 8 carbon atoms).

In particular, from the viewpoint of market distribution and a price of a raw material monomer and strength (e.g., pencil strength) of a film obtained, it is preferred that $R_1$ to $R_8$ are each independently a hydrogen atom, an alkyl group having 1 to 3 carbon atoms or an aryl group having 6 to 12 carbon atoms, and more preferred are a hydrogen atom, a methyl group and a phenyl group.

In formula (2) above, X represents —O—, —S—, —SO—, —SO$_2$—, —CO—, a cycloalkylene group having 6 to 12 carbon atoms (preferably 6 to 10 carbon atoms, and more preferably 6 to 8 carbon atoms) or a divalent group represented by general formula (3) or general formula (4) below.

The cycloalkylene group as X may be substituted with 1 to 12 (preferably 1 to 8, more preferably 1 to 6, and even more preferably 1 to 3) alkyl groups having 1 to 3 carbon atoms.

In a preferred embodiment, the cycloalkylene group as X is substituted with at least one (preferably 1 to 8, more preferably 1 to 6, and even more preferably 1 to 3) alkyl groups having 1 to 3 carbon atoms. In this case, the glass transition temperature can be increased while maintaining solubility in solvents. In a specific embodiment, the cycloalkylene group as X is cyclohexene substituted with at least one (preferably 1 to 8, more preferably 1 to 6, and even more preferably 1 to 3) alkyl groups having 1 to 3 carbon atoms.

In another preferred embodiment, the cycloalkylene group as X is a cycloalkylene group having 7 to 12 carbon atoms which may be substituted with 1 to 12 (preferably 1 to 8, more preferably 1 to 6, and even more preferably 1 to 3) alkyl groups having 1 to 3 carbon atoms. In this case, the glass transition temperature can be increased while maintaining solubility in solvents.

In yet another preferred embodiment, X represents a cycloalkylene group having 7 to 12 carbon atoms, and the cycloalkylene group may be substituted with 1 to 12 alkyl groups having 1 to 3 carbon atoms. In this case, the glass transition temperature can be increased while maintaining solubility in solvents.

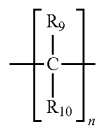
(3)

In formula (3) above, $R_9$ and $R_{10}$ are each independently selected from a hydrogen atom, a fluorine atom, a chlorine atom, a bromine atom, an iodine atom, an alkyl group having 1 to 20 carbon atoms (preferably 1 to 10 carbon atoms, and more preferably 1 to 5 carbon atoms), an alkoxy group having 1 to 7 carbon atoms (preferably 1 to 5 carbon atoms, and more preferably 1 to 3 carbon atoms), an aryl group having 6 to 12 carbon atoms (preferably 6 to 10 carbon atoms, and more preferably 6 to 8 carbon atoms), an aralkyl group having 7 to 17 carbon atoms (preferably 7 to 12 carbon atoms, and more preferably 7 to 10 carbon atoms) and an alkenyl group having 2 to 15 carbon atoms (preferably 2 to 5 carbon atoms, and more preferably 2 to 3 carbon atoms).

Each of the alkyl group, the alkoxy group, the aryl group, the aralkyl group and the alkenyl group in $R_9$ and $R_{10}$ may have a substituent. The substituent that may be possessed is at least one selected from a fluorine atom, a chlorine atom, a bromine atom, an iodine atom, an alkyl group having 1 to 20 carbon atoms (preferably 1 to 10 carbon atoms, and more preferably 1 to 5 carbon atoms) and an aryl group having 6 to 12 carbon atoms (preferably 6 to 10 carbon atoms, and more preferably 6 to 8 carbon atoms).

In formula (3) above, $R_9$ and $R_{10}$ may be bonded to each other to form a carbocyclic ring having 3 to 20 carbon atoms (preferably 3 to 12 carbon atoms, and more preferably 3 to 8 carbon atoms) or a heterocyclic ring having 1 to 20 carbon atoms (preferably 1 to 12 carbon atoms, and more preferably 1 to 8 carbon atoms). Each of the carbocyclic ring and the heterocyclic ring may have a substituent. The substituent that may be possessed is at least one selected from a fluorine atom, a chlorine atom, a bromine atom, an iodine atom and an alkyl group having 1 to 20 carbon atoms (preferably 1 to 10 carbon atoms, and more preferably 1 to 3 carbon atoms).

Note that in formula (3) above, there is no case where both $R_9$ and $R_{10}$ are a methyl group.

In particular, from the viewpoint of market distribution and a price of a raw material monomer and strength (e.g., pencil strength) of a film obtained, it is preferred that $R_9$ and $R_{10}$ are each independently an alkyl group having 1 to 20 carbon atoms (preferably 1 to 10 carbon atoms, and more preferably 1 to 5 carbon atoms), an aryl group having 6 to 12 carbon atoms (preferably 6 to 10 carbon atoms, and more preferably 6 to 8 carbon atoms), an aralkyl group having 7 to 17 carbon atoms (preferably 7 to 12 carbon atoms, and more preferably 7 to 10 carbon atoms) or an alkenyl group having 2 to 15 carbon atoms (preferably 2 to 5 carbon atoms, and more preferably 2 to 3 carbon atoms), and more preferred are an alkyl group having 1 to 20 carbon atoms (preferably 1 to 10 carbon atoms, and more preferably 1 to 5 carbon atoms) and an aryl group having 6 to 12 carbon atoms (preferably 6 to 10 carbon atoms, and more preferably 6 to 8 carbon atoms).

In formula (3) above, n represents an integer of 0 to 20. From the viewpoint of market distribution and a price of a raw material monomer and strength (e.g., pencil strength) of a film obtained, n is preferably an integer of 1 to 12, and more preferably an integer of 1 to 3.

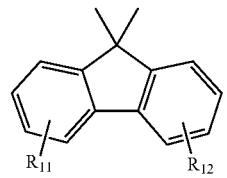
(4)

In formula (4) above, $R_{11}$ and $R_{12}$ are each independently selected from a hydrogen atom, a fluorine atom, a chlorine atom, a bromine atom, an iodine atom, an alkyl group having 1 to 20 carbon atoms (preferably 1 to 9 carbon atoms, and more preferably 1 to 5 carbon atoms), an alkoxy group having 1 to 7 carbon atoms (preferably 1 to 5 carbon atoms, and more preferably 1 to 3 carbon atoms), an aryl group having 6 to 12 carbon atoms (preferably 6 to 10 carbon atoms, and more preferably 6 to 8 carbon atoms), an aralkyl group having 7 to 17 carbon atoms (preferably 7 to 12 carbon atoms, and more preferably 7 to 10 carbon atoms) and an alkenyl group having 2 to 15 carbon atoms (preferably 2 to 5 carbon atoms, and more preferably 2 to 3 carbon atoms).

Each of the alkyl group, the alkoxy group, the aryl group, the aralkyl group and the alkenyl group in $R_{11}$ and $R_{12}$ may have a substituent. The substituent that may be possessed is at least one selected from a fluorine atom, a chlorine atom, a bromine atom, an iodine atom, an alkyl group having 1 to 20 carbon atoms (preferably 1 to 10 carbon atoms, and more preferably 1 to 5 carbon atoms) and an aryl group having 6 to 12 carbon atoms (preferably 6 to 10 carbon atoms, and more preferably 6 to 8 carbon atoms).

In formula (4) above, $R_{11}$ and $R_{12}$ may be bonded to each other to form a carbocyclic ring having 3 to 20 carbon atoms (preferably 3 to 12 carbon atoms, and more preferably 3 to 8 carbon atoms) or a heterocyclic ring having 1 to 20 carbon atoms (preferably 1 to 12 carbon atoms, and more preferably 1 to 6 carbon atoms). Each of the carbocyclic ring and the heterocyclic ring may have a substituent. The substituent that may be possessed is at least one selected from a fluorine atom, a chlorine atom, a bromine atom, an iodine atom, an alkyl group having 1 to 20 carbon atoms (preferably 1 to 10 carbon atoms, and more preferably 1 to 5 carbon atoms) and an aryl group having 6 to 12 carbon atoms (preferably 6 to 10 carbon atoms, and more preferably 6 to 8 carbon atoms).

In particular, from the viewpoint of market distribution of a raw material monomer, it is preferred that $R_{11}$ and $R_{12}$ are each independently a hydrogen atom or a methyl group, and more preferred is a hydrogen atom.

From the viewpoint of the improvement of heat resistance and solubility in non-halogenated organic solvents, the structural unit (B) represented by general formula (2) preferably contains a ring structure such as cycloalkane and aryl as X.

Hereinafter, preferred examples of the structural unit (B) will be described.

In one embodiment, the structural unit (B) represented by general formula (2) is represented by general formula (3A):

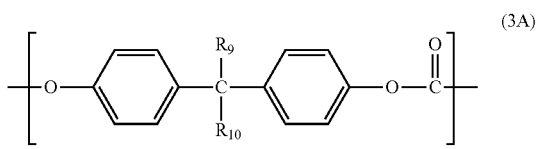

(3A)

In formula (3A) above, $R_9$ represents an alkyl group having 1 to 20 carbon atoms. In this regard, $R_9$ is preferably an alkyl group having 1 to 9 carbon atoms, and more preferably an alkyl group having 1 to 5 carbon atoms, and from the viewpoint of market distribution and a price of a raw material monomer, $R_9$ is even more preferably a methyl group, an ethyl group or a propyl group, and particularly preferably a methyl group.

In formula (3A) above, $R_{10}$ represents an aryl group having 6 to 12 carbon atoms. In this regard, $R_{10}$ is preferably an aryl group having 6 to 8 carbon atoms, and from the viewpoint of market distribution and a price of a raw material monomer, $R_{10}$ is particularly preferably a phenyl group.

In a preferred embodiment, the structural unit (B) is represented by general formula (3B):

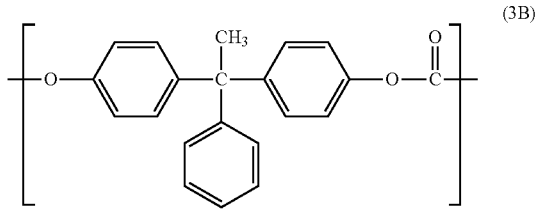

(3B)

As formula (3A) or (3B) above, when $R_{10}$ has a structure including an aromatic ring, the rotational potential energy of the molecular chain is increased and the glass transition temperature can be improved.

In one embodiment, the structural unit (B) represented by general formula (2) is represented by general formula (5) below. When the polycarbonate resin has a structure of formula (5), it is preferred on the point that solubility in non-halogenated organic solvents is improved.

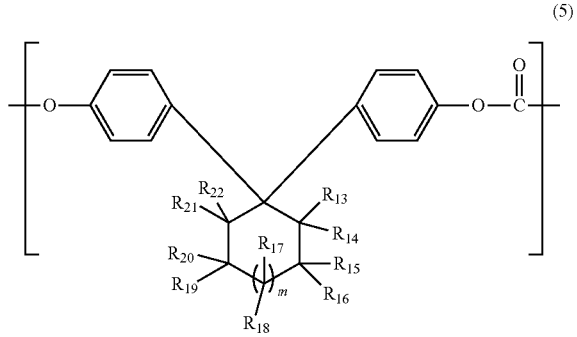

(5)

In formula (5) above, m represents an integer of 1 to 7.
In one embodiment, in formula (5), m is 1.

Specifically, in a preferred embodiment, the structural unit (B) is represented by general formula (5A):

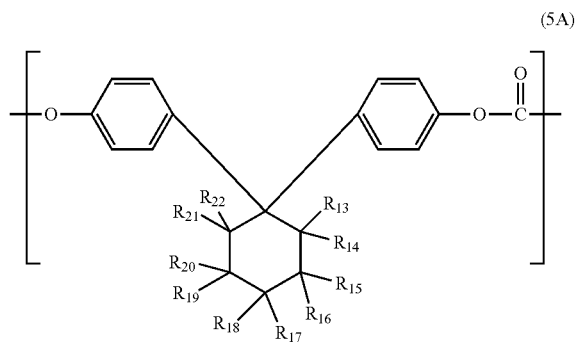

(5A)

In formula (5) and formula (5A) above, $R_{13}$, $R_{14}$, $R_{15}$, $R_{16}$, $R_{17}$ and $R_{18}$ (hereinafter sometimes abbreviated as "$R_{13}$ to $R_{18}$") each independently represent a hydrogen atom or an alkyl group having 1 to 3 carbon atoms. Preferably, $R_{13}$ to $R_{18}$ are each independently a hydrogen atom, methyl, ethyl or propyl.

In one embodiment, in formula (5) above, m is 2 to 7, and $R_{13}$, $R_{14}$, $R_{15}$, $R_{16}$, $R_{17}$, $R_{18}$, $R_{19}$, $R_{20}$, $R_{21}$ and $R_{22}$ each independently represent a hydrogen atom or an alkyl group having 1 to 3 carbon atoms.

In one embodiment, in formula (5) and formula (5A) above, at least one (preferably 1 to 6, and more preferably 1 to 3) of $R_{13}$ to $R_{18}$ is an alkyl group having 1 to 3 carbon atoms (e.g., methyl and ethyl). In this case, the glass transition temperature can be increased while maintaining solubility in solvents.

In one embodiment, in formula (5) and formula (5A) above, each of $R_{13}$ to Ris is a hydrogen atom. In one embodiment, in formula (5) above, m represents an integer of 2 to 7, and each of $R_{13}$ to $R_{18}$ is a hydrogen atom.

In one embodiment, the structural unit (B) represented by general formula (2) is represented by general formula (4), and $R_{11}$ and $R_{12}$ are each independently selected from a hydrogen atom and an aryl group having 6 to 12 carbon atoms. Having such a structure is preferred on the point that a polycarbonate resin having a high glass transition temperature, by which a film having low birefringence can be produced, is obtained thereby.

As the structural unit (B) represented by general formula (2), one type may be used solely, or two or more types may be used in combination.

In the polycarbonate resin of the embodiment, the molar ratio between the structural unit (A) represented by general formula (1) and the structural unit (B) represented by general formula (2) (A/B) is 45/55 to 95/5. When the molar ratio is within this range, solubility in solvents (e.g., non-halogenated solvents) can be improved while achieving a high glass transition temperature. From the viewpoint of the glass transition temperature and solubility in solvents, the molar ratio between the structural unit (A) and the structural unit (B) (A/B) is preferably 45/55 to 80/20, and more preferably 50/50 to 80/20.

The polycarbonate resin may comprise another structural unit (C) in addition to the structural unit (A) and the structural unit (B) within a range in which solubility in solvents and high glass transition temperatures are not impaired.

The ratio of the sum of the structural unit (A) and the structural unit (B) in the polycarbonate resin is preferably 70 to 100% by mass, and more preferably 80 to 100% by mass relative to the polycarbonate resin (total mass: 100% by mass).

Examples of the structural unit (C) include structural units derived from a synthetic resin such as a polycarbonate other than the polycarbonate resin of the present invention, aromatic polyester, aliphatic polyester, polyamide, polystyrene, polyolefin, acrylic, amorphous polyolefin, ABS and AS, a biodegradable resin such as polylactic acid and polybutylene succinate or a rubber.

The polycarbonate resin may contain at least one additive such as an antioxidant, a processing stabilizer, a light stabilizer, a heavy metal deactivator, a flame retardant, a lubricant, an antistatic agent, a surfactant, an antimicrobial agent, a mold release agent, an ultraviolet absorber, a plasticizer and a compatibilizer within a range in which the characteristics of the present invention are not impaired.

The method for producing the polycarbonate resin is not particularly limited, and it can be produced by a conventionally known method, using a dihydroxy compound and a carbonate bonding agent as raw materials. Examples of the method include a method in which a dihydroxy compound is directly reacted with phosgene or the like (interfacial polymerization method, phosgene method) and a method in which a dihydroxy compound and a carbonic acid diester are subjected to a transesterification reaction in a molten state (transesterification method, melting method).

Regarding the dihydroxy compound, it is sufficient when dihydroxy compounds corresponding to the structural unit (A) represented by general formula (1) and the structural unit (B) represented by general formula (2) are used. Specifically, these are a compound represented by general formula (1)' below (i.e., 4,4'-(4-methylpentane-2,2-diyl)diphenol; also referred to as "MIBK" in this specification) and a compound represented by general formula (2)' below. According to need, a dihydroxy compound corresponding to the above-described another structural unit (C) is used in combination therewith.

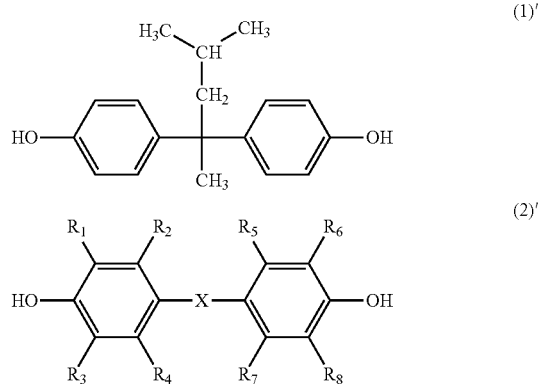

In formula (2)' above, $R_1$ to $R_8$ and X are the same as those in formula (2) above.

When the production is carried out using the interfacial polymerization method, usually, the dihydroxy compound is reacted with phosgene in the presence of an acid binding agent and a solvent. As the acid binding agent, for example, pyridine, an alkali metal hydroxide such as sodium hydroxide and potassium hydroxide or the like is used. As the solvent, for example, methylene chloride, chloroform or the like is used. For promoting a polycondensation reaction, a tertiary amine catalyst such as triethylamine, a quaternary ammonium salt such as benzyl triethylammonium chloride or the like may be used.

In the above-described production method, it is preferred that a monofunctional compound such as phenol, p-t-butylphenol (PTBP), p-cumylphenol, long chain alkyl substituted phenol, alkoxy substituted phenol and benzotriazole substituted phenol is further added to the reaction system as a molecular weight control agent (end terminator). Note that the timing for the addition of the molecular weight control agent (end terminator) is not particularly limited. It may be added during the reaction of the dihydroxy compound, or alternatively, it may be added after the reaction of the dihydroxy compound.

The amount of the molecular weight control agent to be used is usually 0.95 mol or more, and preferably 1.5 mol or more, but usually 10 mol or less, and preferably 5 mol or less relative to 100 mol of the dihydroxy compound.

By the addition of the molecular weight control agent, a terminal structure derived from the molecular weight control agent is introduced into the end of the polycarbonate resin (copolymer). In one embodiment, the terminal structure derived from the molecular weight control agent is contained in an amount of usually 0.95 mol or more, and preferably 1.5 mol or more, but usually 10 mol or less, and preferably 5 mol or less relative to 100 mol of structural units derived from the dihydroxy compound (for example, the sum of the structural unit (A) represented by general formula (1) and the structural unit (B) represented by general formula (2)).

In one embodiment of the present invention, the terminal structure of the polycarbonate resin (copolymer) is derived from a compound selected from phenol, p-t-butylphenol (PTBP), p-cumylphenol, long chain alkyl substituted phenol, alkoxy substituted phenol and benzotriazole substituted phenol.

The addition of the molecular weight control agent is preferred on the point that the viscosity average molecular weight (Mv) of the polycarbonate resin can be adjusted within a desired range, and that specific physical properties derived from the structure of the molecular weight control agent can be imparted to the polycarbonate resin.

Examples of the alkoxy substituted phenol include a compound represented by formula (T1)':

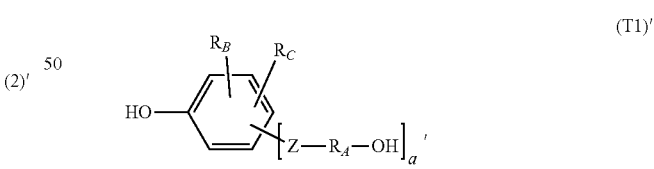

By using the compound of formula (T1)' above, a terminal structure represented by formula (T1) below is introduced into the end of the main chain of the polycarbonate resin.

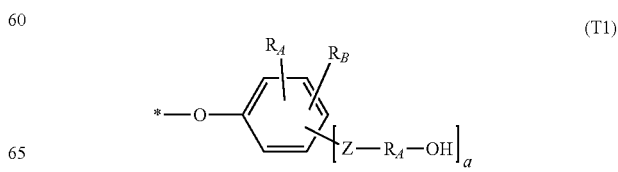

In formula (T1)' and formula (T1):

$R_A$ represents an alkylene group having 1 to 20 carbon atoms or alkenylene group having 2 to 20 carbon atoms, which may have a substituent;

$R_B$ and $R_C$ each independently represent a hydrogen atom, an alkyl group having 1 to 20 carbon atoms, an alkoxy group having 1 to 10 carbon atoms or an aryl group having 6 to 12 carbon atoms;

Z represents an ether bond, a carbonyl group, an ester bond or a single bond;

a represents an integer of 1 to 3; and

* represents a position of bonding to the main chain of the polycarbonate resin. Examples of the compound represented by formula (T1)' above include, but are not limited to, p-hydroxyphenethyl alcohol (PHEP), m-hydroxyphenethyl alcohol, o-hydroxyphenethyl alcohol, o-hydroxybenzyl alcohol (i.e., salicyl alcohol), p-hydroxybenzyl alcohol, m-hydroxybenzyl alcohol, vanillyl alcohol, homovanillyl alcohol, 3-(4-hydroxy-3-methoxyphenyl)-1-propanol, sinapyl alcohol, coniferyl alcohol and p-coumaryl alcohol. Among them, from the viewpoint of reactivity, p-hydroxyphenethyl alcohol and p-hydroxybenzyl alcohol are preferred, and p-hydroxyphenethyl alcohol is more preferred.

These alkoxy substituted phenols are excellent on the point that a hydroxyl group can be introduced into the end of the main chain of the polycarbonate resin obtained, and that reactivity can be imparted to the polycarbonate resin.

Alternatively, the molecular weight control agent may be a compound represented by formula (T2)':

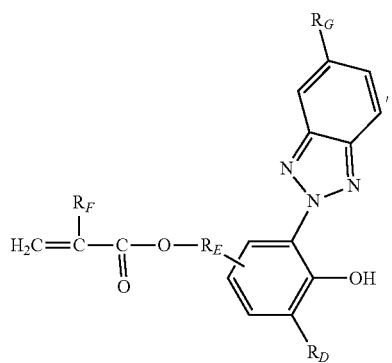

(T2)'

By using the compound of formula (T2)' above, a terminal structure represented by formula (T2) below is introduced into the end of the main chain of the polycarbonate resin.

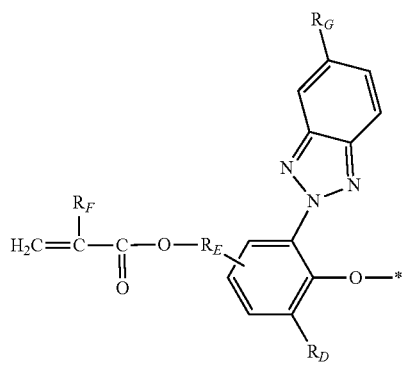

(T2)

In formula (T2)' and formula (T2): $R_D$ represents hydrogen or an alkyl group having 1 to 6 carbon atoms; $R_E$ represents an alkylene group having 1 to 6 carbon atoms; $R_F$ represents a hydrogen atom or a methyl group; $R_G$ represents a hydrogen atom or halogen; and * represents a position of bonding to the main chain of the polycarbonate resin.

In particular, as the compound represented by formula (T2)' above, a compound represented by formula (T3)' below is preferred. By blending the compound of formula (T3)', a terminal structure represented by formula (T3) below is introduced into the end of the main chain of the polycarbonate resin.

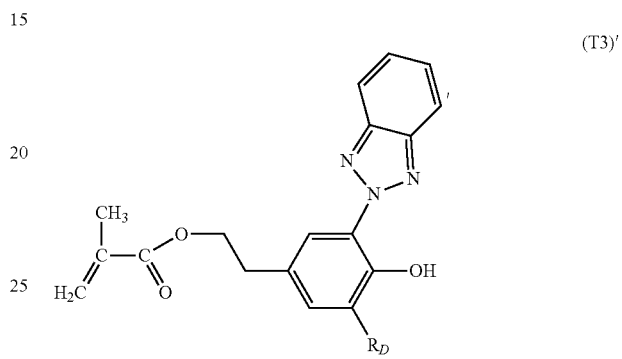

(T3)'

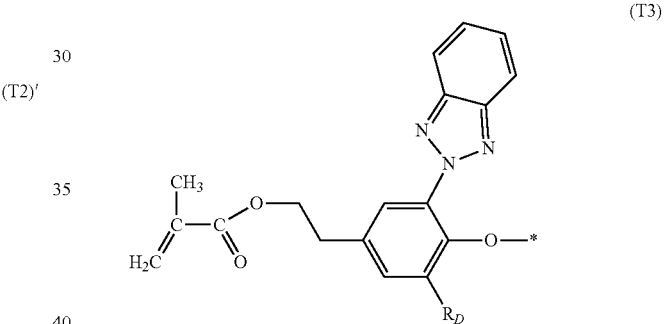

(T3)

In formula (T3)' and formula (T3): $R_D$ represents hydrogen or an alkyl group having 1 to 6 carbon atoms; and * represents a position of bonding to the main chain of the polycarbonate resin. These benzotriazole substituted phenols are excellent on the point that reactivity derived from a methacryl group and ultraviolet absorption performance derived from a benzotriazole group can be imparted to the polycarbonate resin obtained.

From the viewpoint of reactivity during synthesis, availability and a price, it is particularly preferred to use, as the molecular weight control agent, a compound selected from the group consisting of p-t-butylphenol (PTBP), a compound represented by formula (T1)' above (particularly p-hydroxyphenethyl alcohol (PHEP)) and a compound represented by formula (T2)' above (particularly a compound represented by formula (T3)').

In one embodiment of the present invention, the polycarbonate resin comprises a terminal structure selected from a terminal structure represented by formula (T1) above (particularly a terminal structure derived from p-hydroxyphenethyl alcohol (PHEP)), a terminal structure represented by formula (T2) above (particularly a terminal structure represented by formula (T3) above) and a terminal structure represented by formula (T4) below.

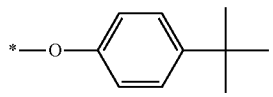
(T4)

In one embodiment of the present invention, the polycarbonate resin comprises a terminal structure represented by formula (T4) above.

In one embodiment of the present invention, the polycarbonate resin comprises a terminal structure represented by formula (T1) above (particularly a terminal structure derived from p-hydroxyphenethyl alcohol (PHEP)).

In one embodiment of the present invention, the polycarbonate resin comprises a terminal structure represented by formula (T2) above (particularly a terminal structure represented by formula (T3)).

If desired, an antioxidant such as sodium sulfite and hydrosulfite and a branching agent such as phloroglucin, isatin bisphenol and trisphenol ethane may be added in small amounts.

When the production is carried out using the transesterification method or melting method, usually, the dihydroxy compound is reacted with a carbonic acid diester in the presence of a transesterification catalyst.

Specific examples of the carbonic acid diester include an aromatic carbonic acid diester such as diphenyl carbonate, ditolyl carbonate, bis(2-chlorophenyl)carbonate, dinaphthyl carbonate and bis(4-phenylphenyl)carbonate. When using a dicarboxylic acid, dicarboxylic acid ester or the like in addition to the carbonic acid diester, a polyester carbonate can be obtained.

As the transesterification catalyst, at least one of an alkali metal compound and an alkaline earth metal compound can be used. A basic compound such as a basic boron compound, a basic phosphorus compound, a basic ammonium compound and an amine compound can be supplementally used in combination. As the transesterification catalyst, one material may be used, or a plurality of materials may be used in combination.

(Physical Properties of Polycarbonate Resin)

From the viewpoint of ease of handling of a resin solution, the viscosity average molecular weight (Mv) of the polycarbonate resin is preferably 16,000 to 80,000, and more preferably 20,000 to 80,000, and from the viewpoint of strength (e.g., pencil strength) of a film obtained, it is even more preferably 26,000 to 80,000, still more preferably 26,000 to 60,000, still even more preferably 26,000 to 50,000, and particularly preferably 26,000 to 40,000.

The viscosity average molecular weight (Mv) of the polycarbonate resin can be measured according to the below-described method.
(Conditions for measuring viscosity average molecular weight (Mv))
Measurement apparatus: Ubbelohde capillary viscometer
Solvent: dichloromethane
Concentration of resin solution: 0.5 gram/deciliter
Measurement temperature: 25° C.

The measurement is carried out under the above-described conditions to determine a limiting viscosity [η] deciliter/gram with a Huggins constant of 0.45, thereby calculating the viscosity average molecular weight according to the below-described formula.

$$\eta = 1.23 \times 10^{-4} \times Mv^{0.83}$$

The glass transition temperature (Tg) of the polycarbonate resin is preferably 150° C. or higher. When it is 150° C. or higher, excellent heat resistance is obtained. From the viewpoint of heat resistance and easiness at the time of molding, the glass transition temperature is more preferably 155° C. or higher, and even more preferably 157° C. or higher. For example, the glass transition temperature (Tg) of the polycarbonate resin is preferably 150 to 200° C., more preferably 155 to 200° C., and even more preferably 157 to 200° C.

The glass transition temperature (Tg) of the polycarbonate resin can be measured according to the below-described method.
(Conditions for measuring glass transition temperature (Tg))
Measurement apparatus: differential scanning calorimeter (DSC)
Temperature raising rate: 10° C./min
Gas flow environment: nitrogen, 20 ml/min
Sample pretreatment: heating and melting at 300° C.

The polycarbonate resin has excellent solubility in solvents. From the viewpoint of the improvement of efficiency at the time of wet molding, it is preferred that the soluble concentration of the polycarbonate resin, which is the concentration (% by mass) of the polycarbonate resin that can be dissolved in a solution (100% by mass) of the solvent, is 20% by mass or more. In particular, it is desirable that the polycarbonate resin is dissolved in a non-halogenated organic solvent (preferably at least one of a ketone-based solvent and an ester-based solvent described later) in an amount of preferably 20% by mass or more, and more preferably 25% by mass or more.

2. Polycarbonate Resin Composition

To the polycarbonate resin, an additive such as an antioxidant, a processing stabilizer, a light stabilizer, a heavy metal deactivator, a flame retardant, a lubricant, an antistatic agent, a surfactant, an antimicrobial agent, a mold release agent, an ultraviolet absorber, a plasticizer and a compatibilizer may be added to provide a polycarbonate resin composition within a range in which the characteristics of the present invention are not impaired.

The polycarbonate resin can be kneaded with one or more of a synthetic resin such as a polycarbonate other than the polycarbonate resin of the present invention, aromatic polyester, aliphatic polyester, polyamide, polystyrene, polyolefin, acrylic, amorphous polyolefin, ABS and AS, a biodegradable resin such as polylactic acid and polybutylene succinate, a rubber and the like to be used as a polymer alloy.

The method for blending additives in the polycarbonate resin is not particularly limited as long as it is a usually used polymer blending method, and examples thereof include a mixing method using a tumbler, a V-type blender, a super mixer, a Nauta mixer, a Banbury mixer, a kneading roll, an extruder or the like, and a solution blending method in which the above-described components are mixed in a state of being dissolved in a common good solvent such as methylene chloride.

The polycarbonate resin or polycarbonate resin composition can be used as a raw material of various molded bodies such as films, sheets, disks, lenses and prisms.

3. Molded Body

According to one embodiment, a molded body obtained by molding the above-described polycarbonate resin or resin composition containing the same is provided.

For example, the polycarbonate resin of the embodiment or resin composition containing the same can be suitably utilized as a film. One embodiment is a film containing the polycarbonate resin.

The polycarbonate resin of the embodiment or resin composition containing the same can be molded according to various methods. Molding is carried out according to any method, for example, dry molding such as compression molding, transfer molding, injection molding, blow molding, extrusion molding, laminate molding and calender molding; or wet molding such as solution casting and casting.

Since the polycarbonate resin of the embodiment has excellent solubility in solvents, it is particularly suitable for wet molding. In particular, it is suitable as a raw material of a film such as an optical film obtained by wet molding.

Film forming by means of wet molding not only has advantages that a thin film is easily obtained and that a non-oriented film can be obtained, but also has advantages that coloring and gel generation do not occur at the time of high-temperature melting and that a high-quality film can be obtained. For this reason, it is used for the production of a film of a material having a particularly high glass transition temperature. When performing wet molding, it is required that a resin has satisfactory solubility and solution stability with respect to a solvent.

Conventionally, many polycarbonates having a high glass transition temperature have low solubility in solvents, and most of them are dissolved in a non-halogenated organic solvent (particularly a low-boiling-point non-halogenated organic solvent) only at a low concentration. For this reason, molding efficiency of wet molding is low, and there is a problem in terms of productivity. However, the polycarbonate resin of the present invention has advantages that it exhibits high solubility even in low-boiling-point non-halogenated organic solvents and that it has high solution stability. For this reason, wet molding can be performed with high molding efficiency.

For wet molding, a solution of the polycarbonate resin is used. As a solvent to be used for preparing the solution, any solvent can be used as long as it dissolves the polycarbonate resin of the present invention and has moderate volatility. From the viewpoint of safety and hygiene at the time of wet molding, it is particularly preferred to use a non-halogenated organic solvent. One embodiment of the present invention is a resin solution containing a non-halogenated organic solvent and the polycarbonate resin dissolved in the non-halogenated solvent. One embodiment of the present invention is a film obtained by wet-molding the resin solution. Another embodiment of the present invention is a method for producing a film, which includes wet-molding the resin solution.

The resin concentration in the resin solution is usually 1 to 30% by weight. From the viewpoint of the improvement of efficiency of wet molding, the concentration of the polycarbonate resin in the resin solution is preferably 20% by mass or more. The concentration of the polycarbonate resin in the resin solution is preferably 20% by mass or more, and more preferably 20 to 50% by mass.

The non-halogenated organic solvent is not particularly limited, but from the viewpoint of the improvement of efficiency of wet molding, the non-halogenated organic solvent preferably has a relatively low boiling point (for example, a boiling point of 100° C. or lower, preferably 90° C. or lower, and more preferably 80° C. or lower). Specific examples thereof include a ketone-based solvent, an ester-based solvent and an ether-based solvent.

In one embodiment, the non-halogenated organic solvent constituting the resin solution is at least one of the ketone-based solvent and the ester-based solvent. In one embodiment, the dissolution concentration of the polycarbonate resin in one of the ketone-based solvent and the ester-based solvent is 20% by mass or more. In one preferred embodiment, the dissolution concentration of the polycarbonate resin in both of the ketone-based solvent and the ester-based solvent is 20% by mass or more.

Examples of the ketone-based solvent include acetone, methyl ethyl ketone, methyl isobutyl ketone, cyclohexanone and isophorone. Among them, from the viewpoint of low boiling points and solubility of the polycarbonate resin in solvents, methyl ethyl ketone is preferred.

Examples of the ester-based solvent include methyl acetate, ethyl acetate, propyl acetate, butyl acetate, 2-ethoxyethyl acetate, 2-methoxy-1-methylethyl acetate and ethyl lactate. Among them, from the viewpoint of low boiling points and solubility of the polycarbonate resin in solvents, ethyl acetate is preferred.

In one embodiment, the non-halogenated organic solvent is at least one of methyl ethyl ketone and ethyl acetate.

The molded product of the present invention is a molded product containing the polycarbonate resin including the above-described various preferred embodiments and constitutions. The shape, pattern, color, size, etc. of the molded product are not limited, and may be arbitrarily determined according to the intended use thereof.

The molded product of the present invention can be utilized for, for example, electrical and electronic equipments, office automation equipments, optical media, automobile components and building components. Specifically, it can be preferably utilized for electrical and electronic equipments (for example, personal computers, game machines, television receivers, display units such as liquid crystal display devices and plasma display devices, printers, copy machines, scanners, facsimiles, electronic organizers, PDAs, electronic desk calculators, electronic dictionaries, cameras, video cameras, mobile telephones, smartphones, tablets, battery packs, drives and readers of storage media, mouse devices, numeric keypads, CD players, MD players and portable radio sets/audio players), etc. In particular, the film produced by wet molding has satisfactory heat resistance and transparency and is suitably used as a laminated film in which a gas barrier film and a solvent-resistant film are layered on both the surfaces of the film, or a film for liquid crystal substrates (plastic cell substrate) or film for liquid crystal displays such as a phase difference film that is used together with a transparent conductive film and a polarization plate, and specifically, it can be advantageously used for tablets, smartphones, handy terminals, various display devices, etc. Note that a plastic cell substrate is used in an unstretched state, but when it is to be used as a phase difference film, it is stretched and oriented in at least one axial direction so that it has optimum birefringence characteristics, thereby providing a phase difference film. As the method for stretching the film, a publicly-known method can be used, and longitudinal uniaxial stretching, lateral uniaxial stretching, multi-stage stretching, simultaneous biaxial stretching, etc. may be used.

EXAMPLES

Hereinafter, the present invention will be described in detail with reference to examples, but the technical scope of the present invention should not be limited thereto. In the examples, "parts" and "%" mean "parts by mass" and "% by mass", respectively.

The respective physical properties of polycarbonate resins in Examples and Comparative Examples were measured by the below-described methods.

<Viscosity average molecular weight (Mv)>
(Conditions for measuring viscosity average molecular weight (Mv))
Measurement apparatus: Ubbelohde capillary viscometer
Solvent: dichloromethane
Concentration of resin solution: 0.5 gram/deciliter
Measurement temperature: 25° C.

The measurement was carried out under the above-described conditions to determine a limiting viscosity [η] deciliter/gram with a Huggins constant of 0.45, thereby calculating the viscosity average molecular weight according to the below-described formula.

$$\eta = 1.23 \times 10^{-4} \times Mv^{0.83}$$

<Glass Transition Temperature (Tg)>
The measurement was carried out under the below-described conditions.
(Conditions for measuring glass transition temperature (Tg))
Measurement apparatus: differential scanning calorimeter (DSC) (DSC-50 manufactured by Shimadzu Corporation)
Temperature raising rate: 10° C./min
Gas flow environment: nitrogen, 20 ml/min
Sample pretreatment: heating and melting at 300° C.
<Solubility in Solvents>
The polycarbonate resin was mixed with methyl ethyl ketone (MEK) or ethyl acetate (AcOEt) as a solvent. The case where the dissolution concentration of the polycarbonate resin in each of the solvents (concentration of the polycarbonate resin dissolved in the solution, % by mass) was 20% by mass or more was judged as "good", and the case where it was less than 20% by mass was judged as "poor". Further, depending on solubilities in the two solvents (MEK, AcOEt), evaluation was made based on the below-described criteria.
A: The polycarbonate resin was dissolved with the dissolution concentration of 20% by mass or more in both the solvents.
B: The polycarbonate resin was dissolved with the dissolution concentration of 20% by mass or more in only one of the solvents.
C: The polycarbonate resin was dissolved with the dissolution concentration of 20% by mass or more in none of the solvents.
<Synthesis of Polycarbonate Resin>

Example 1

50.4 g (0.187 mol) of bisphenol MIBK (MIBK) manufactured by Honshu Chemical Industry Co., Ltd., 54.1 g (0.187 mol) of bisphenol AP (BPAP) manufactured by Honshu Chemical Industry Co., Ltd. and 0.5 g of hydrosulfite were added to and dissolved in 500 ml of 9% (by mass) aqueous solution of sodium hydroxide and 400 ml of pure water. 350 ml of dichloromethane was added thereto, and 51.0 g of phosgene was injected into the solution over 40 minutes while stirring with the solution temperature being held at 15 to 25° C.

After injection of phosgene was completed, 100 ml of 9% (w/w) aqueous solution of sodium hydroxide, 200 ml of dichloromethane, and 1.12 g (0.00746 mol) of p-t-butylphenol (PTBP) manufactured by Honshu Chemical Industry Co., Ltd. that was dissolved in 100 ml of dichloromethane were added thereto, and the mixture was vigorously stirred to be emulsified. After that, 0.5 ml of triethylamine (TEA) as a polymerization catalyst was added thereto to perform polymerization for about 40 minutes.

The polymerization solution was separated into an aqueous phase and an organic phase, and the organic phase was neutralized with phosphoric acid and repeatedly washed with pure water until pH of the washing solution became neutral. The organic solvent was distilled away from the produced polycarbonate resin solution, thereby obtaining a powdery polycarbonate resin. The obtained polycarbonate resin is a random copolymer composed of an MIBK-derived structural unit (i.e., structural unit (A)) and a BPAP-derived structural unit (structural unit (B), unit of general formula (3B)), and both the ends have a PTBP-derived structure.

Example 2

A powdery polycarbonate resin was obtained in a manner similar to that in Example 1, except that BPAP was changed to 50.0 g (0.187 mol) of bisphenol Z (BPZ) manufactured by Honshu Chemical Industry Co., Ltd. The obtained polycarbonate resin is a random copolymer composed of an MIBK-derived structural unit (i.e., structural unit (A)) and a BPZ-derived structural unit (structural unit (B), unit of general formula (5A) in which $R_{13}$ to $R_{22}$ are a hydrogen atom), and both the ends have a PTBP-derived structure.

Example 3

A powdery polycarbonate resin was obtained in a manner similar to that in Example 1, except that BPAP was changed to 70.7 g (0.187 mol) of biscresol fluorene (BCFL) manufactured by Honshu Chemical Industry Co., Ltd., and that 0.056 g of benzyltriethylammonium chloride manufactured by FUJIFILM Wako Pure Chemical Corporation was added as a polymerization catalyst at the time of a reaction prior to injection of phosgene. The obtained polycarbonate resin is a random copolymer composed of an MIBK-derived structural unit (i.e., structural unit (A)) and a BCFL-derived structural unit (structural unit (B), unit of general formula (2) in which: X is represented by general formula (4); and $R_1$ to $R_8$, $R_{11}$ and $R_{12}$ are a hydrogen atom), and both the ends have a PTBP-derived structure.

Example 4

A powdery polycarbonate resin was obtained in a manner similar to that in Example 1, except that BPAP was changed to 52.7 g (0.187 mol) of bisphenol 3MZ (BP3MZ) manufactured by Honshu Chemical Industry Co., Ltd. The obtained polycarbonate resin is a random copolymer composed of an MIBK-derived structural unit (i.e., structural unit (A)) and a BP3MZ-derived structural unit (structural unit (B), unit of general formula (5A) in which: $R_{15}$ is a methyl group; and $R_{13}$, $R_{14}$ and $R_{16}$ to $R_{22}$ are a hydrogen atom), and both the ends have a PTBP-derived structure.

Example 5

A powdery polycarbonate resin was obtained in a manner similar to that in Example 1, except that the amount of PTBP was changed to 1.87 g (0.0126 mol). The obtained polycarbonate resin is a random copolymer composed of an MIBK-derived structural unit (i.e., structural unit (A)) and a BPAP-derived structural unit (structural unit (B), unit of general formula (3B)), and both the ends have a PTBP-derived structure.

Example 6

A powdery polycarbonate resin was obtained in a manner similar to that in Example 1, except that the amount of PTBP was changed to 0.56 g (0.00373 mol). The obtained polycarbonate resin is a random copolymer composed of an MIBK-derived structural unit (i.e., structural unit (A)) and a BPAP-derived structural unit (structural unit (B), unit of general formula (3B)), and both the ends have a PTBP-derived structure.

Example 7

A powdery polycarbonate resin was obtained in a manner similar to that in Example 1, except that the amount of MIBK was changed to 60.5 g (0.224 mol), and that BPAP was changed to 40.0 g (0.149 mol) of bisphenol Z (BPZ) manufactured by Honshu Chemical Industry Co., Ltd. The obtained polycarbonate resin is a random copolymer composed of an MIBK-derived structural unit (i.e., structural unit (A)) and a BPZ-derived structural unit (structural unit (B), unit of general formula (5A) in which $R_{13}$ to $R_{22}$ are a hydrogen atom), and both the ends have a PTBP-derived structure.

Example 8

A powdery polycarbonate resin was obtained in a manner similar to that in Example 1, except that the amount of MIBK was changed to 80.6 g (0.299 mol), that BPAP was changed to 26.3 g (0.075 mol) of bisphenol cyclododecane (BPCD) manufactured by Honshu Chemical Industry Co., Ltd., and that 0.020 g of benzyltriethylammonium chloride manufactured by FUJIFILM Wako Pure Chemical Corporation was added as a polymerization catalyst at the time of a reaction prior to injection of phosgene. The obtained polycarbonate resin is a random copolymer composed of an MIBK-derived structural unit (i.e., structural unit (A)) and a BPCD-derived structural unit (structural unit (B), unit of general formula (5) in which: m is 6; and $R_{13}$ to $R_{22}$ are a hydrogen atom), and both the ends have a PTBP-derived structure.

Example 9

A powdery polycarbonate resin was obtained in a manner similar to that in Example 1, except that 540 ml of 9% (w/w) aqueous solution of sodium hydroxide, 170 ml of pure water and 51.7 g of phosgene were used at the time of a reaction, and that PTBP was changed to 1.71 g (0.0124 mol) of p-hydroxyphenethyl alcohol (PHEP) manufactured by Otsuka Chemical Co., Ltd., which was added prior to injection of phosgene. The obtained polycarbonate resin is a random copolymer composed of an MIBK-derived structural unit (i.e., structural unit (A)) and a BPAP-derived structural unit (structural unit (B), unit of general formula (3B)), and both the ends have a PHEP-derived structure.

Example 10

A powdery polycarbonate resin was obtained in a manner similar to that in Example 1, except that 540 ml of 9% (w/w) aqueous solution of sodium hydroxide, 170 ml of pure water and 51.7 g of phosgene were used at the time of a reaction, and that PTBP was changed to 4.01 g (0.0124 mol) of RUVA-93 manufactured by Otsuka Chemical Co., Ltd. The obtained polycarbonate resin is a random copolymer composed of an MIBK-derived structural unit (i.e., structural unit (A)) and a BPAP-derived structural unit (structural unit (B), unit of general formula (3B)), and both the ends have a RUVA-93-derived structure.

Comparative Example 1

A powdery polycarbonate resin was obtained in a manner similar to that in Example 1, except that BPAP was changed to 46.2 g (0.187 mol) of bisphenol A (BPA) manufactured by NIPPON STEEL Chemical & Material Co., Ltd. The obtained polycarbonate resin is a random copolymer composed of an MIBK-derived structural unit (i.e., structural unit (A)) and a BPA-derived structural unit, and both the ends have a PTBP-derived structure.

Comparative Example 2

A powdery polycarbonate resin was obtained in a manner similar to that in Example 1, except that the amount of MIBK was changed to 40.3 g (0.149 mol), and that the amount of BPAP was changed to 65.0 g (0.224 mol). The obtained polycarbonate resin is a random copolymer composed of an MIBK-derived structural unit (i.e., structural unit (A)) and a BPAP-derived structural unit (structural unit (B), unit of general formula (3B)), and both the ends have a PTBP-derived structure.

Comparative Example 3

A powdery polycarbonate resin was obtained in a manner similar to that in Example 1, except that MIBK was changed to 45.3 g (0.187 mol) of bisphenol B (BPB) manufactured by Honshu Chemical Industry Co., Ltd. The obtained polycarbonate resin is a random copolymer composed of a BPB-derived structural unit and a BPAP-derived structural unit (structural unit (B), unit of general formula (3B)), and both the ends have a PTBP-derived structure.

Comparative Example 4

A powdery polycarbonate resin was obtained in a manner similar to that in Example 1, except that MIBK was changed to 45.3 g (0.187 mol) of bisphenol C (BPC) manufactured by Honshu Chemical Industry Co., Ltd., and that 0.056 g of benzyltriethylammonium chloride manufactured by FUJIFILM Wako Pure Chemical Corporation was added as a polymerization catalyst at the time of a reaction prior to injection of phosgene. The obtained polycarbonate resin is a random copolymer composed of a BPC-derived structural unit and a BPAP-derived structural unit (structural unit (B), unit of general formula (3B)), and both the ends have a PTBP-derived structure.

Abbreviations and structures of the raw material monomers used in the above-described Examples are shown below.

TABLE A

| Abbreviation of raw material monomer (upper part) and compound name thereof (lower part) | Structure |
|---|---|
| MIBK<br>4,4'-(4-methylpentane-2,2-diyl)diphenol | 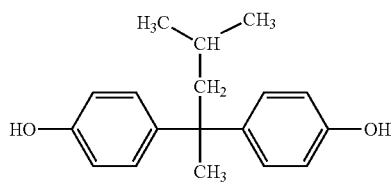 |
| BPAP<br>4,4'-(1-phenylethane-1,1-diyl)diphenol | 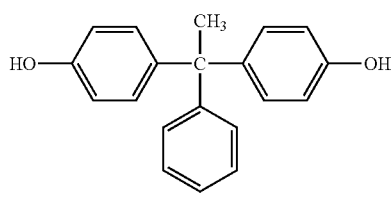 [SMILES: CC(c1ccccc1)(c1ccc(O)cc1)c1ccc(O)cc1] |
| BPZ<br>4,4'-(cyclohexane-1,1-diyl)diphenol | 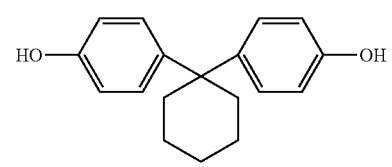 [SMILES: Oc1ccc(C2(c3ccc(O)cc3)CCCCC2)cc1] |
| BCFL<br>4,4'-(9H-fluorene-9,9-diyl)bis(2-methylphenol) | 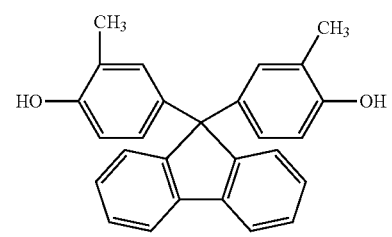 [SMILES: Cc1cc(C2(c3ccc(O)c(C)c3)c3ccccc3-c3ccccc32)ccc1O] |
| BP3MZ<br>4,4'-(3-methylcyclohexane-1,1-diyl)diphenol | 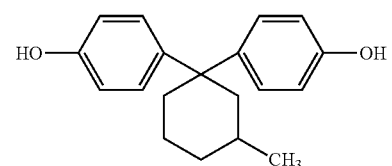 |
| BPCD<br>4,4'-(cyclododecane-1,1-diyl)diphenol | 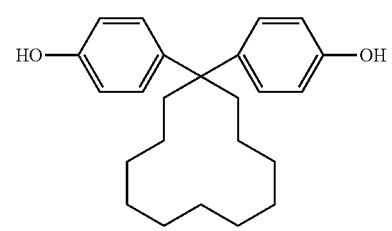 [SMILES: Oc1ccc(C2(c3ccc(O)cc3)CCCCCCCCCCC2)cc1] |
| BPA<br>4,4'-(propane-2,2-diyl)diphenol | 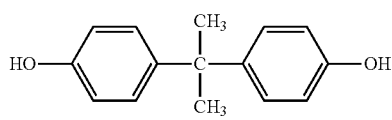 |
| BPB<br>4,4'-(butane-2,2-diyl)diphenol | 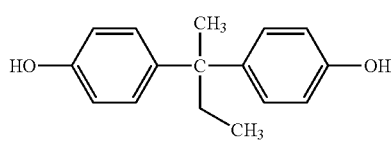 |

TABLE A-continued

| Abbreviation of raw material monomer (upper part) and compound name thereof (lower part) | Structure |
|---|---|
| BPC<br>4,4'-(propane-2,2-diyl)bis(2-methylphenol) | HO–C₆H₂(CH₃)–C(CH₃)₂–C₆H₂(CH₃)–OH (2,2-bis(3-methyl-4-hydroxyphenyl)propane structure) |

Further, structures and abbreviations of the molecular weight control agents (end terminators) used in the above-described Examples and terminal structures introduced into the copolymers are shown below.

TABLE B

| Abbreviation (upper part) and structure (lower part) of molecular weight control agent | Terminal structure |
|---|---|
| PTBP<br>HO–C₆H₄–C(CH₃)₃<br>p-t-butylphenol | *–O–C₆H₄–C(CH₃)₃ |
| PHEP<br>HO–C₆H₄–CH₂CH₂–OH<br>p-hydroxyphenethyl alcohol | *–O–C₆H₄–CH₂CH₂–OH |
| RUVA-93<br>H₂C=C(CH₃)–C(=O)–O–CH₂CH₂–C₆H₃(OH)(benzotriazolyl)<br>3-(2H-benzotriazol-2-yl)-4-hydroxyphenethyl methacrylate | H₂C=C(CH₃)–C(=O)–O–CH₂CH₂–C₆H₃(benzotriazolyl)–O–* |

In the table, * represents a position of bonding to the main chain of the polycarbonate resin (copolymer).

The composition, viscosity average molecular weight (Mv), glass transition temperature (Tg) and solubility in solvents of each of the polycarbonate resins synthesized in the above-described Examples and Comparative Examples are shown in the below-described table.

TABLE 1

| | Composition of polycarbonate resin | | | | Viscosity average | Glass transition | Solubility in solvents | | |
|---|---|---|---|---|---|---|---|---|---|
| | Type of raw material monomer | | Molar ratio | Terminal | molecular weight | temperature | | | Comprehensive |
| | M1 | M2 | M1/M2 | structure | Mv | Tg (° C.) | MEK | AcOet | evaluation |
| Example 1 | MIBK | BPAP | 50/50 | PTBP | 34,100 | 159 | Good | Good | A |
| Example 2 | MIBK | BPZ | 50/50 | PTBP | 32,500 | 155 | Good | Poor | B |
| Example 3 | MIBK | BCFL | 50/50 | PTBP | 27,300 | 189 | Good | Poor | B |
| Example 4 | MIBK | BP3MZ | 50/50 | PTBP | 33,500 | 174 | Good | Good | A |
| Example 5 | MIBK | BPAP | 50/50 | PTBP | 28,800 | 159 | Good | Good | A |
| Example 6 | MIBK | BPAP | 50/50 | PTBP | 57,700 | 164 | Good | Good | A |
| Example 7 | MIBK | BPZ | 60/40 | PTBP | 33,200 | 151 | Good | Good | A |
| Example 8 | MIBK | BPCD | 80/20 | PTBP | 33,300 | 158 | Good | Good | A |
| Example 9 | MIBK | BPAP | 50/50 | PHEP | 27,300 | 156 | Good | Good | A |
| Example 10 | MIBK | BPAP | 50/50 | RUVA-93 | 24,300 | 150 | Good | Good | A |
| Comparative Example 1 | MIBK | BPA | 50/50 | PTBP | 36,900 | 143 | Good | Good | A |
| Comparative Example 2 | MIBK | BPAP | 40/60 | PTBP | 33,700 | 465 | Poor | Poor | C |
| Comparative Example 3 | BPB | BPAP | 50/50 | PTBP | 34,400 | 165 | Poor | Poor | C |
| Comparative Example 4 | BPC | BPAP | 50/50 | PTBP | 33,200 | 150 | Poor | Poor | C |

As shown in Table 1 above, it is confirmed that the polycarbonate resins of Examples 1-8, which comprise the structural unit (A) represented by general formula (2) and the structural unit (B) represented by general formula (2), wherein the molar ratio between the structural unit (A) and the structural unit (B) (A/B) is 45/55 to 95/5, have a high glass transition temperature (150° C. or higher) and excellent solubility in solvents.

In particular, a high glass transition temperature and excellent solubility in solvents were obtained in the case where the structure of formula (3B) (BPAP) is contained as the structural unit (B) (M2) (Examples 1, 5 and 6).

It is confirmed that more excellent solubility in solvents and a significantly higher glass transition temperature can be obtained in the case where cyclohexane substituted with an alkyl group (BP3MZ) is contained as the structural unit (B) (M2) (Example 4) when compared to the case where unsubstituted cyclohexane (BPZ) is contained (Examples 2 and 7).

More excellent solubility in solvents and a higher glass transition temperature were obtained in the case where cycloalkylene having 12 carbon atoms (BPCD) is contained as the structural unit (B) (M2) (Example 8) when compared to the case where cyclohexane having 6 carbon atoms (BPZ) is contained (Examples 2 and 7). It is suggested that solubility in solvents and glass transition temperature are improved by increasing the carbon number of cycloalkylene.

In the case where a fluorene structure is contained as the structural unit (B) (M2) (Example 3), a polycarbonate resin having a particularly high glass transition temperature was obtained.

Meanwhile, in the case where the structural unit (B) is not contained, the glass transition temperature was low (Comparative Example 1) or solubility in solvents was poor (Comparative Example 2).

In the case where the structural unit (A) is not contained, solubility in solvents was insufficient (Comparative Examples 3 and 4).

The scope of the present invention is not limited to the description. In addition to the above-described examples, the present invention can be suitably changed and then practiced within a range in which the effects of the present invention are not reduced. Note that all the documents and publications cited herein are incorporated herein by reference in their entireties regardless of purposes thereof. In addition, the contents disclosed in the claims and specification of Japanese Patent Application No. 2019-108054 (filed on Jun. 10, 2019), to which priority is claimed by the present application, are incorporated herein.

INDUSTRIAL APPLICABILITY

The polycarbonate resin of the present invention has a high glass transition temperature and excellent solubility in solvents and is suitably used for wet molding. A film obtained by wet molding can be used in a wide range of applications including electrical and electronic materials such as electrical and electronic equipments and office automation equipments, optical materials such as optical media, automobile components and building components.

The invention claimed is:

1. A polycarbonate resin which is a copolymer consisting of a structural unit (A) represented by general formula (1) and a structural unit (B) represented by general formula (3), and comprises a terminal structure selected from a terminal structure represented by formula (T1) or a terminal structure represented by formula (T2), the molar ratio between the structural unit (A) and the structural unit (B) (A/B) being 45/55 to 95/5:

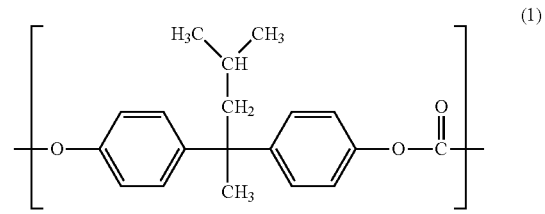

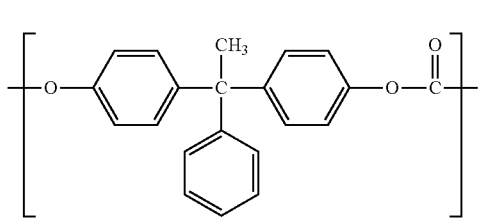
(3B)

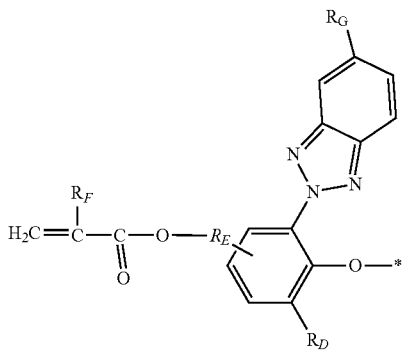
(T2)

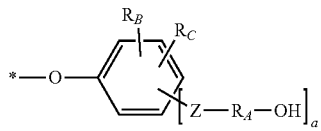
(T1)

wherein in formula (T1):

$R_A$ represents an alkylene group having 1 to 20 carbon atoms or alkenylene group having 2 to 20 carbon atoms, which may have a substituent;

$R_B$ and $R_C$ each independently represent a hydrogen atom, an alkyl group having 1 to 20 carbon atoms, an alkoxy group having 1 to 10 carbon atoms or an aryl group having 6 to 12 carbon atoms;

Z represents an ether bond, a carbonyl group, an ester bond or a single bond;

a represents an integer of 1 to 3; and

\* represents a position of bonding to the main chain of the polycarbonate resin, wherein in formula (T2)):

$R_D$ represents hydrogen or an alkyl group having 1 to 6 carbon atoms;

$R_E$ represents an alkylene group having 1 to 6 carbon atoms;

$R_F$ represents a hydrogen atom or a methyl group;

$R_G$ represents a hydrogen atom or halogen; and

\* represents a position of bonding to the main chain of the polycarbonate resin.

2. The resin according to claim 1, which has a viscosity average molecular weight (Mv) of 16,000 to 80,000.

3. The resin according to claim 1, which has a viscosity average molecular weight (Mv) of 26,000 to 80,000.

4. The resin according to claim 1, which has a glass transition temperature (Tg) of 150° C. or higher.

5. A film containing the polycarbonate resin according to claim 1.

6. A resin solution containing a non-halogenated organic solvent and the polycarbonate resin according to claim 1 dissolved in the non-halogenated solvent.

7. The resin solution according to claim 5, wherein the concentration of the polycarbonate resin in the resin solution is 20% by mass or more.

8. The resin solution according to claim 6, wherein the non-halogenated organic solvent is at least one of a ketone-based solvent and an ester-based solvent.

9. A film obtained by wet-molding the resin solution according to claim 6.

10. The resin according to claim 1, which comprises a terminal structure represented by formula (T2).

\* \* \* \* \*